Nov. 23, 1954     F. R. BLAKELY     2,694,826
COUPLING APPARATUS FOR POLARIZED ROTOR BRUSHES
Filed April 14, 1949
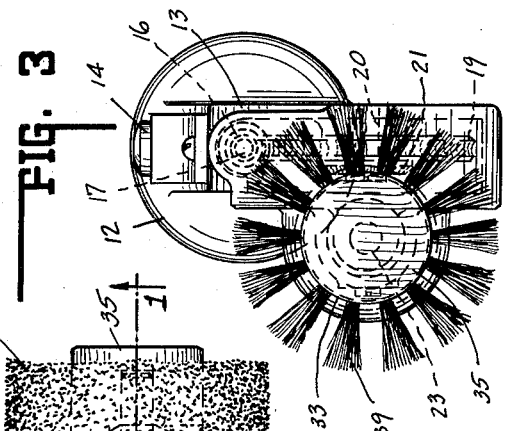
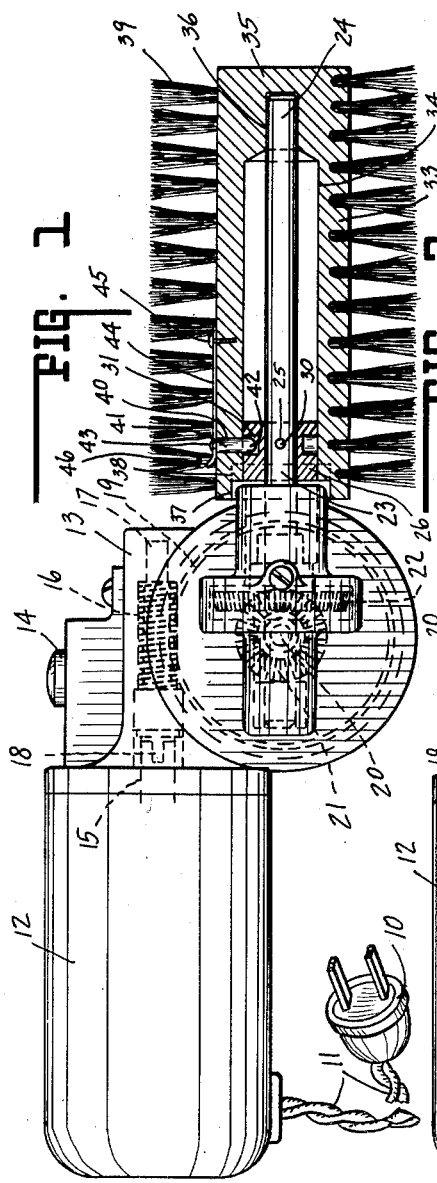
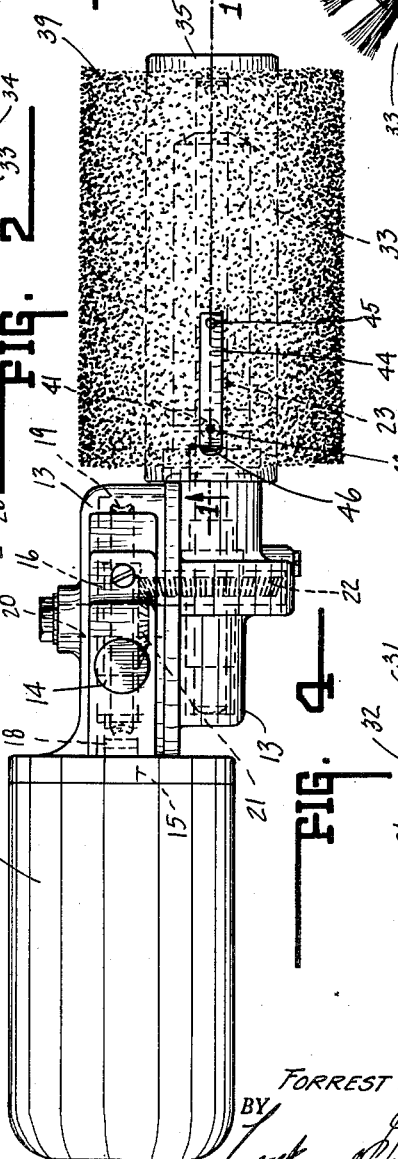
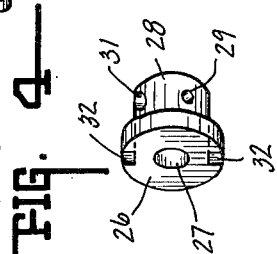
INVENTOR.
FORREST RAY BLAKELY,
BY
Lockwood, Goldsmith & Galt
ATTORNEYS.

United States Patent Office 2,694,826
Patented Nov. 23, 1954

2,694,826

COUPLING APPARATUS FOR POLARIZED ROTOR BRUSHES

Forrest Ray Blakely, Pendleton, Ind.

Application April 14, 1949, Serial No. 87,429

2 Claims. (Cl. 15—179)

This invention relates to a hand type motorized brush structure.

The chief object of the present invention is to provide in a brush of the aforesaid type a coupling apparatus having a separable driving torque connection between a motor driven shaft and the brush, and a detachable locking connection between the motor driven shaft and the brush.

The chief feature of the present invention resides in its simplicity of construction.

Other objects and features of the invention will be set forth more fully hereinafter.

The full nature of the invention will be understood from the accompanying drawings and the following description and claims:

In the drawings, Fig. 1 is a side elevation, parts in section taken on line 1—1 of Fig. 2.

Fig. 2 is a plan view thereof, the brush head being shown in full.

Fig. 3 is an end view of the device.

Fig. 4 is a perspective view of the driving head.

In the drawings, 10 indicates a conventional socket plug from which supply lines 11 extend into handle type motor housing 12. Suitably secured thereto is the gear casing 13 from which projects switch button 14 that controls a normally open motor switch. When the button is depressed the motor circuit is closed to the motor (not shown) enclosed within the handle housing and having shaft 15.

A worm 16 on shaft 17 has tongue and groove drive connection 18 with the motor shaft. Worm 16 meshes with wheel 19 on shaft 20. This shaft carries bevel gear 21 meshing with bevel gear 22 on shaft 23 that projects beyond two-piece housing 13.

Shaft 23 terminates in a pilot bearing portion 24. Adjacent housing 13 the shaft 23 includes hole 25 therethrough. A collar 26, see Fig. 4, includes bore 27 therethrough to pass shaft 23. Hub 28 thereof includes the diametrically aligned holes 29. A pin 30 or the like rigidly secures the collar to this shaft by passing through the hole 25 and the holes 29. This collar also includes socket 31 and a pair of diametrically disposed slots 32 for brush head connection thereto and driving association therewith, respectively.

The brush head comprises a cylindrical core 33 which has bore 34 and is closed at one end 35. End 35 has bearing surface 36 for accommodation of the end 24 of shaft 23. The open end of the bore is enlarged at 37 to take the enlarged portion of collar 26. The core also includes diametrally disposed lugs, tongues or wings 38 to seat in slots 32. Socket 31 may be duplicated in diametral position if desired.

When the brush head is mounted upon the shaft and collar its outer end is shaft supported and its inner end is tongue or tooth associated with the pinned collar for head rotation by and with the shaft whereby there is provided a separable driving torque connection between the core 33 and collar 26.

The brush head includes a plurality of parallel longitudinally disposed series of bristle tufts 39 that are fully encompassed about and upon the core 33. The latter includes hole 40 and slidably disposed therein is pin 41 having locking end 42 adapted to seat in one of the two sockets 31. The exposed end of said pin is reduced and headed as at 43 and secured thereto is one end of an elongated strip spring 44 having one end anchored as at 45 to said core. The other end 46 is of finger engageable type. This spring normally constrains pin 41 inwardly relative to the core. By this means the brush head aforesaid is detachably mounted and retained upon the shaft and collar.

The housing, two part casing, the button, collar and brush head core each can be of plastic material and thus be extremely light in weight. The motor is preferably of small capacity having a relatively high speed such as about 8000 R. P. M. The motor and brush shaft are disposed in parallel relation and in offset relation.

The preferred form of the invention, reference being had to the appended claims, has been described and illustrated in great detail. This, however, is by way of example only.

The invention claimed is:

1. In a rotating brush for use in brushing the coats of animals, a driven brush coupling shaft, an elongated brush head mounted on said brush coupling shaft and comprising a tubular core, one end of said core engaging said shaft, said core having brush bristles disposed thereon and projecting outwardly therefrom, a collar rigidly secured to said shaft and supporting the other end of said core, a separable driving torque connection between the collar supported end of said core and said collar, and a detachable locking connection between said core and said collar comprising at least one socket formed in said collar, a radially slidable pin extending through said core into register within said socket, and an elongated exteriorly disposed spring carried by said core and normally constraining said pin inwardly for locking connecting with said collar within said socket.

2. In a rotating brush for use in brushing the coats of animals, a driven brush coupling shaft, an elongated brush head mounted on said brush coupling shaft and comprising a tubular core, one end of said core engaging said shaft, said core having brush bristles disposed thereon and projecting outwardly therefrom, a collar rigidly secured to said shaft and supporting the other end of said core, a separable driving torque connection between the collar supporting end of said core and said collar comprising a tongue and slot connection therebetween, and a detachable locking connection between said core and said collar comprising at least one socket formed in said collar, a radially slidable pin carried by said core and nestable within said socket, and an elongated exteriorly disposed spring carried by said core and normally constraining said pin inwardly into nesting relation within said socket for locking purposes.

References Cited in the file of this patent

UNITED STATES PATENTS

| Number | Name | Date |
|---|---|---|
| 1,394,636 | Murray | Oct. 25, 1921 |
| 1,658,264 | Sutton et al. | Feb. 7, 1928 |
| 1,744,365 | Dargavel | Jan. 21, 1930 |
| 1,951,851 | Turner | Mar. 20, 1934 |
| 2,044,344 | Bagnall | June 16, 1936 |
| 2,124,145 | Merkel | July 19, 1938 |
| 2,258,895 | Jakubowski et al. | Oct. 14, 1941 |
| 2,287,725 | Conte | June 23, 1942 |
| 2,448,614 | Mirus | Sept. 7, 1948 |
| 2,493,402 | Hahn | Jan. 3, 1950 |
| 2,542,158 | Soderberg | Feb. 20, 1951 |

FOREIGN PATENTS

| Number | Country | Date |
|---|---|---|
| 222 | Great Britain | Jan. 20, 1876 |
| 116,779 | Switzerland | Sept. 16, 1926 |
| 177,415 | Switzerland | May 31, 1935 |
| 358,883 | Great Britain | Oct. 2, 1931 |
| 536,442 | Germany | Oct. 23, 1931 |
| 541,008 | Germany | Jan. 7, 1932 |